(12) United States Patent
Savopoulos

(10) Patent No.: US 8,642,921 B2
(45) Date of Patent: Feb. 4, 2014

(54) WELDER HAVING A WIRELESS RECEIVER FOR REMOTE CONTROL

(76) Inventor: Savvas Philip Savopoulos, Christiansted, VI (US)

( * ) Notice: Subject to any disclaimer, the term of this patent is extended or adjusted under 35 U.S.C. 154(b) by 1155 days.

(21) Appl. No.: 12/271,598

(22) Filed: Nov. 14, 2008

(65) Prior Publication Data

US 2010/0122974 A1    May 20, 2010

(51) Int. Cl.
*B23K 9/10* (2006.01)
*B23P 11/02* (2006.01)

(52) U.S. Cl.
USPC ........................................ 219/132; 219/130.1

(58) Field of Classification Search
CPC .................................. B23K 9/10; B23P 11/02
USPC .............................................. 219/130.1, 132
See application file for complete search history.

(56) References Cited

U.S. PATENT DOCUMENTS

| | | | | |
|---|---|---|---|---|
| 4,134,050 | A | * | 1/1979 | Sibalis ........................... 318/267 |
| 4,216,367 | A | * | 8/1980 | Risberg ......................... 219/132 |
| 4,216,368 | A | * | 8/1980 | Delay ........................... 219/132 |
| 4,458,132 | A | * | 7/1984 | Reynolds et al. .............. 219/114 |
| 4,533,423 | A | * | 8/1985 | Johnson et al. ................ 156/359 |
| 4,641,292 | A | * | 2/1987 | Tunnell et al. ................. 367/198 |
| 5,406,050 | A | * | 4/1995 | Macomber et al. ......... 219/130.1 |
| 6,040,555 | A | * | 3/2000 | Tiller et al. .................... 219/132 |
| 6,075,225 | A | * | 6/2000 | Heraly et al. .............. 219/130.5 |
| 6,121,575 | A | * | 9/2000 | Ott et al. .................... 219/130.5 |
| 6,297,472 | B1 | * | 10/2001 | Bong et al. ............... 219/125.12 |
| 2004/0026392 | A1 | * | 2/2004 | Feichtinger et al. ....... 219/130.5 |

OTHER PUBLICATIONS

PLC Manuel (www.plcmanual.com/plc-instructions) dated Apr. 21, 2008, accessed through Wayback Machine (www.web.archive.org) on Sep. 29, 2012.*

* cited by examiner

*Primary Examiner* — Mark Paschall
(74) *Attorney, Agent, or Firm* — Morrison & Foerster LLP

(57) ABSTRACT

Welding apparatus includes a welding machine that generates welding electric power and an input unit that includes input switches for controlling the operations of the welding machine. The welding apparatus also includes a wireless receiver unit that is electrically connected to the inputs of the input unit to receive wireless instructions for controlling the operations of the welding machine.

11 Claims, 4 Drawing Sheets

WELDER HAVING A WIRELESS RECEIVER FOR REMOTE CONTROL

FIELD OF THE INVENTION

This invention relates to a welding machine, and in particular, to a remote-controlled welding machine.

BACKGROUND OF THE INVENTION

Welding is a fabrication process that joins materials such as metals by causing coalescence. Welding is often accomplished by melting the work pieces and adding a filler material to form a pool of molten material (the weld puddle) that cools to become a strong joint, with pressure sometimes used in conjunction with heat to produce the weld. Welding is different from soldering and brazing, which involve melting a lower-melting-point material between the work pieces to form a bond between them, without melting the work pieces.

Many different energy sources can be used for welding, including a gas flame, an electric arc, a laser, an electron beam, friction, and ultrasound. Welding machines generally run on fuel such as gas, diesel, liquid petroleum gas, etc., to generate the necessary electrical power for the welding process. A common problem with welding machines is high fuel consumption. Although welding machines are typically located at construction cites, they are typically out of the technician's reach. Thus, welding machines are typically run all day long, consuming a large amount of fuel. For example, on average, common gasoline-based welding machines can use up to ten gallons of gas daily. Thus, what is needed is a system that allows welding machines to be operated more efficiently.

SUMMARY OF THE INVENTION

Embodiments of the present invention are directed to a system and method for remotely controlling operating machinery such as a welding apparatus. In an exemplary embodiment, a welding apparatus is provided that includes a welding machine that generates welding electric power. The welding machine may include an input unit that includes input switches for controlling the operations of the welding machine. Such inputs may include, for example, a start input, an engine ON input, and a low idle input.

The welding apparatus may also include a wireless receiver that is electrically connected to the inputs of the input unit to receive remotely instructions for the operations of the welding machine. The wireless receiver may receive such instructions from a handheld wireless controller which can be used to control the operations of the welding machine from a remote location, through a wireless link. Using the handheld wireless controller, a user may turn the welding machine on or off, start the welding machine, or place the welding machine in a low idle state. By controlling the operation of the welding machine remotely, the user is able to place the welding machine at a low idle state or turn the welding machine off completely, thus reducing the gas consumption of the welding machine.

Under conditions where a conventional welding machine was previously run for ten hours in order to provide, for example, one hour worth of total welding requirements, a welding machine according to the present invention could provide as much as a ninety percent savings in fuel costs.

DESCRIPTION OF THE PREFERRED EMBODIMENT OF THE INVENTION

According to embodiments of the invention, there is provided a system and method for remotely controlling operating machinery such as a welder.

Figure 1:
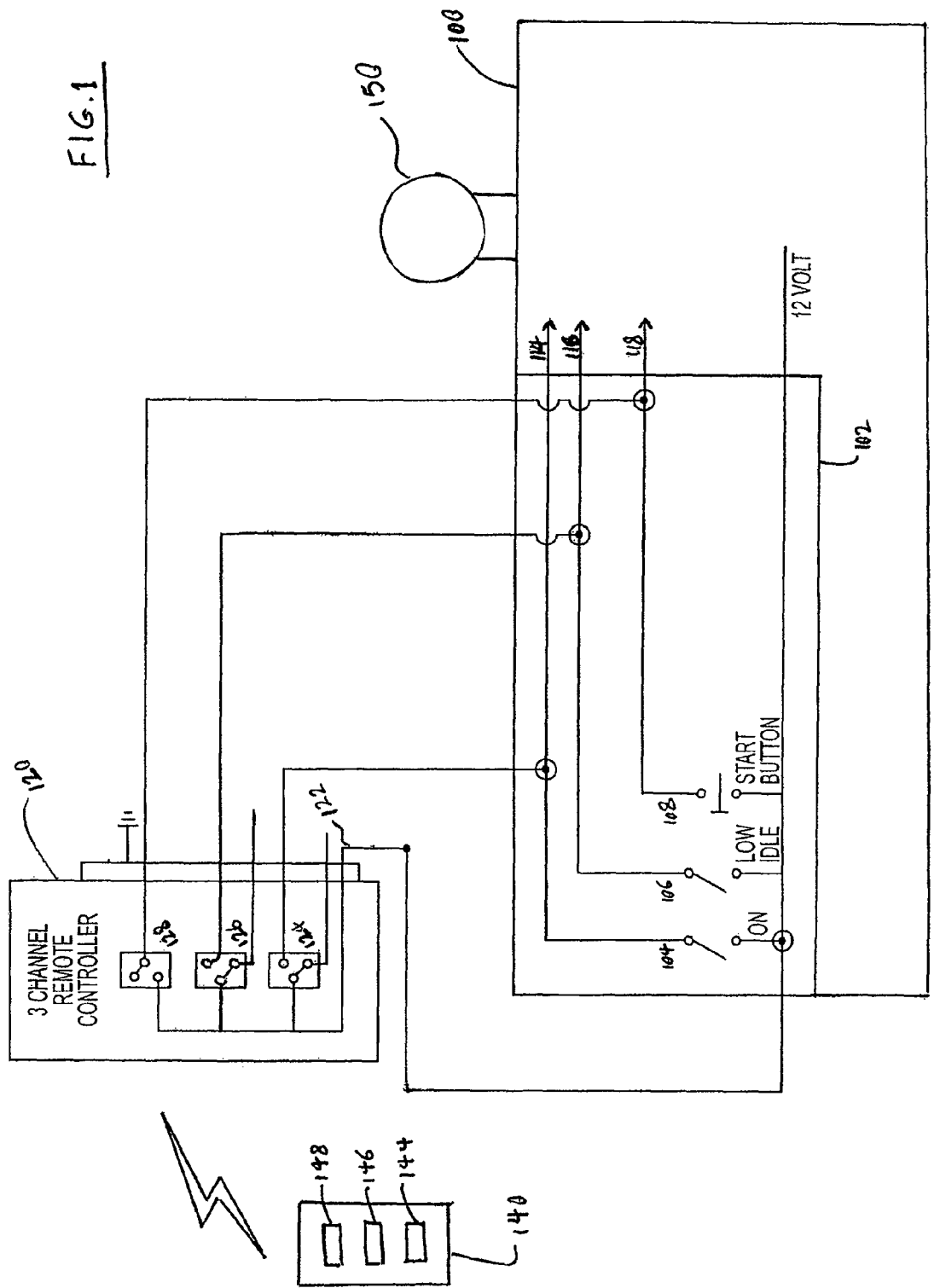
FIG. 1 depicts a block diagram of an exemplary system according to a first embodiment of the invention.

Referring to FIG. 1, there is depicted a welding machine 100 that includes a welding an input unit 102, according to an exemplary embodiment of the invention. The welding machine 100 may also include various welder components such as an engine or power generator that generates electricity from gas, diesel, or liquid petroleum gas, etc. The welding machine 100 may be, for example, a Ranger 8 Welder by Lincoln Electronics® including an Onan engine. The welding input unit 102, which provides all the conventional buttons and switches for the user to control the operations of the welding machine 100, may include an ON switch 104 that the welding machine 100 on and off, a low idle switch 106 that places the generator in a low idle state, and a start button 108 that starts the power generator. Each of the ON switch 104, the low idle switch 106, and the start button 108 include an electrical switch that connect a voltage source to an ON/OFF output 114, a low idle output 116, and a start output 118, respectively. The voltage source may be, for example, a 12V voltage input. In an exemplary embodiment, the ON switch 104 and the low idle switch 106 are SPST (Single-Pole, Single-Throw) switches, whereas the start button 108 is a normally open switch.

In an exemplary embodiment of the invention, in order to remotely control the various functions of the welding machine 100, i.e., to turn the welding machine 100 on or off, place the welding machine 100 in an idle mode, or start the welding process, a wireless receiver unit 120 is provided. The wireless receiver unit 120 includes two SPDT (Single-Pole, Double-Throw) switches 124, 126 and a normally open switch 128. Alternatively, the switches 124, 126 may be SPST (Single-Pole, Single-Throw) switches.

A voltage input 122 is provided to the switches 124, 126, 128. The voltage input 122 may be coupled to a voltage source, either from the welding machine 100 or elsewhere. The output of the SPDT switch 124 may coupled to the ON/OFF output 114. Similarly, the outputs of the switches 126, 128 may be respectfully coupled to the low idle output 116 and start output 118 of the welding controller 102.

The wireless receiver unit 120 may receive wireless instructions from a handheld wireless controller 140 which includes three buttons 144, 146, 148, which correspond to switches 124, 126, 128 of the wireless receiver unit 120, respectively. The handheld wireless controller 140 may be, for example, an off-the-shelf garage door opener or car alarm controller. Using the handheld wireless controller 140, a user of the welding machine 100 may start the welder, place the welder in a low idle state, and turn the welder off, all from a remote location. This provides the user with the ability to place the welder machine 100 in low idle or turn the welding machine 100 off completely when the welding machine 100 is not needed for some period of time, and then restarting the welding machine 100 when necessary, thus increasing the fuel-consumption efficiency of the welding machine 100.

In an exemplary embodiment, a light bulb 150 is provided on the welding machine 100 to indicate whether the welding machine 100 is on or off. The light 150 may be coupled electronically to the ON/OFF output 114. Thus, if the welding machine 100 is on, the light 150 may indicate the status of the welding machine 100 to the user, who may be operating the machine 100 from a distance. In an exemplary embodiment, there may be a light provided for each of the outputs 114, 116, 118, such that the user can view the status of each of the three states of the welding machine 100 from a distance.

Figure 2:
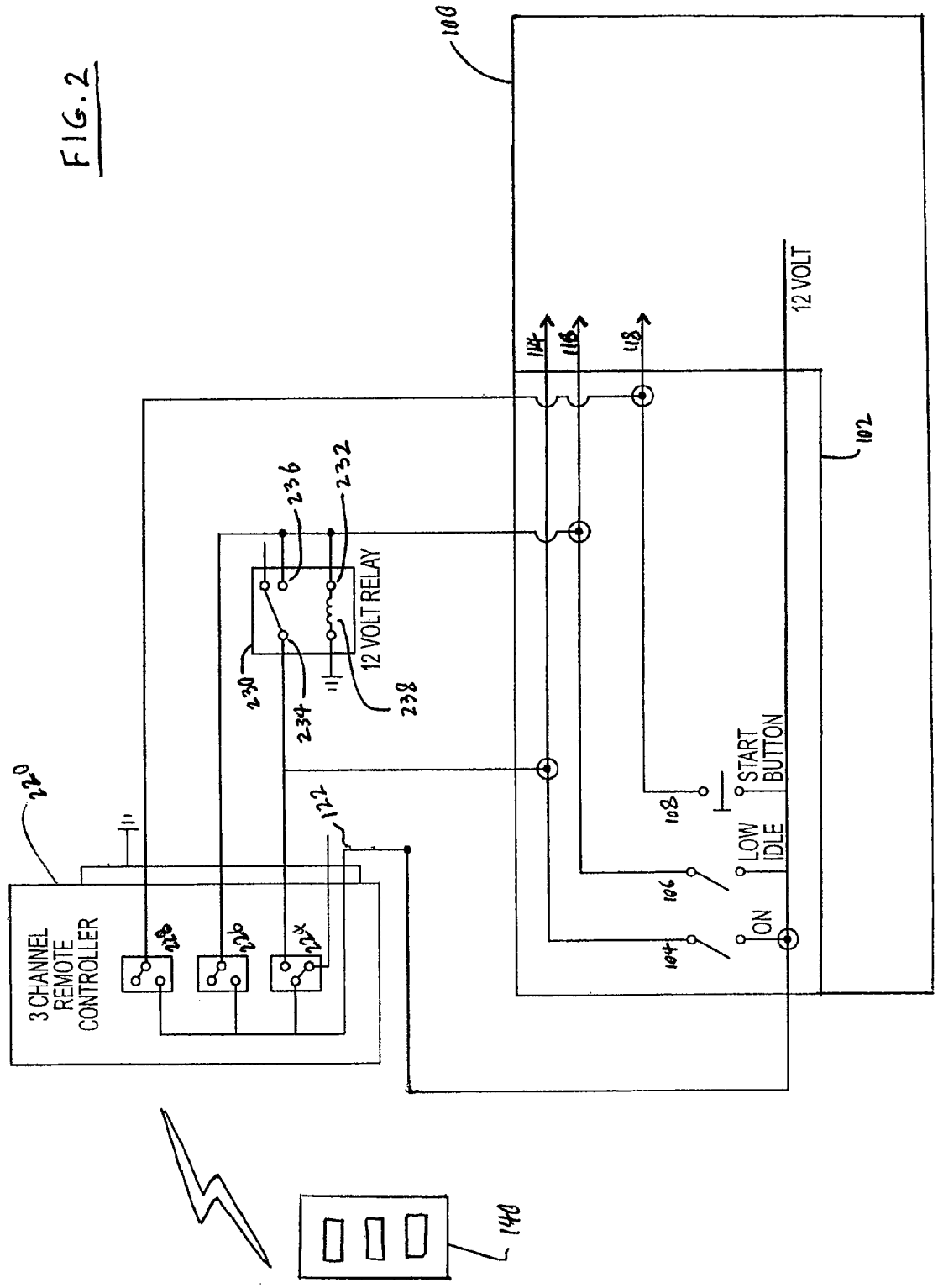
FIG. 2 depicts a block diagram of an exemplary system according to a second embodiment of the invention.

In FIG. 2 there is provided a wireless receiver unit 220 that includes a single SPDT switch 224 and two normally open switches 126, 128. The SPDT switch 224 is coupled to the ON button 104 of the welding machine 100, allowing the user to turn the machine off with a single click of the switch 224. The normally open switch 228 is similarly coupled to the start button, allowing the users to start the welding machine 100 to by a single click of the switch 228. Since the switch 226 is a normally-on switch while the low idle switch 106 is a SPDT switch, the switch 226 is coupled to a retentive relay 230. The relay 230 includes a control terminal 232 connected to the switch 226. The control terminal 232 is connected to a coil 238 inside the relay 230. A first terminal 234 and a second terminal 236 of the relay 230 are respectively connected to the switches 224, 226 of the wireless receiver unit 220. When the switch 226 is closed, it activates the coil 238 of the relay 238, which in turn causes the relay 238 to close the connection between the two terminals 234, 236. Once the two terminals 234, 236 are connected, the coil 238 remains active as long as the ON switch 224 is closed. Accordingly, the output 116 is provided as a constant high despite the switch 226 being open only momentarily.

Figure 3:
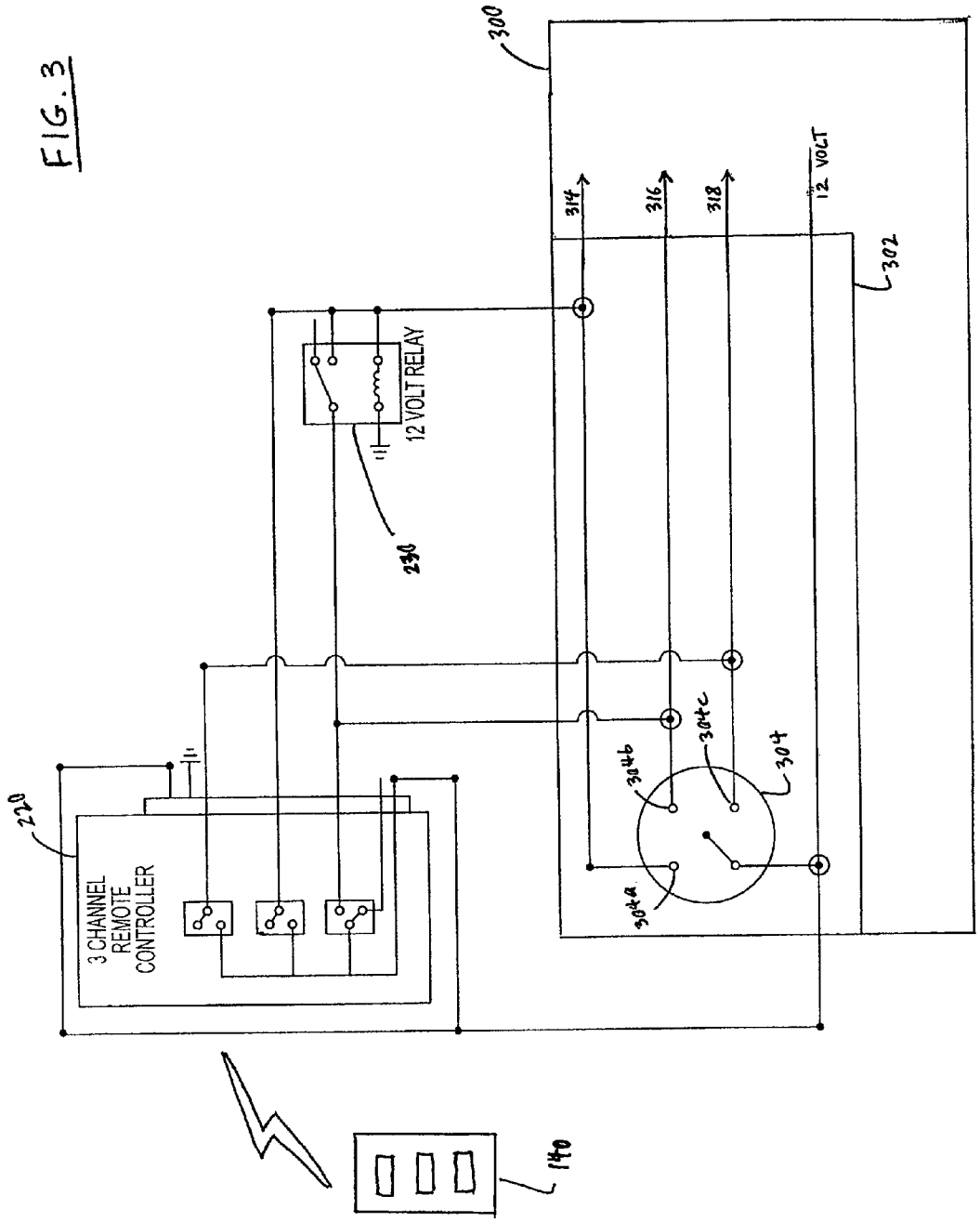
FIG. 3 depicts a block diagram of an exemplary system according to a third embodiment of the invention.

FIG. 3 depicts a welding machine 300 according to another embodiment of the invention. In this embodiment, the input unit 302 of the welding machine 300 includes a dial switch 304 which includes terminals 304a, 304b, 304c respectively connected to outputs 314, 316, 318. Shifting the dial to the terminal 304b turns the welding machine 300 on, similar to the ON switch 104 in FIG. 1. Similarly, shifting the dial to terminals 304a places the welding machine 300 in a low idle position and shifting the dial to terminal 304c starts the welding machine. An example of the welding machine 300 is a Ranger 10,000 Welder by Lincoln Electronics®. By coupling the wireless receiver unit 220 and the retentive relay 230 as shown in FIG., the functions of the welding machine 300 may be controlled remotely via the handheld wireless controller 140.

Figure 4:
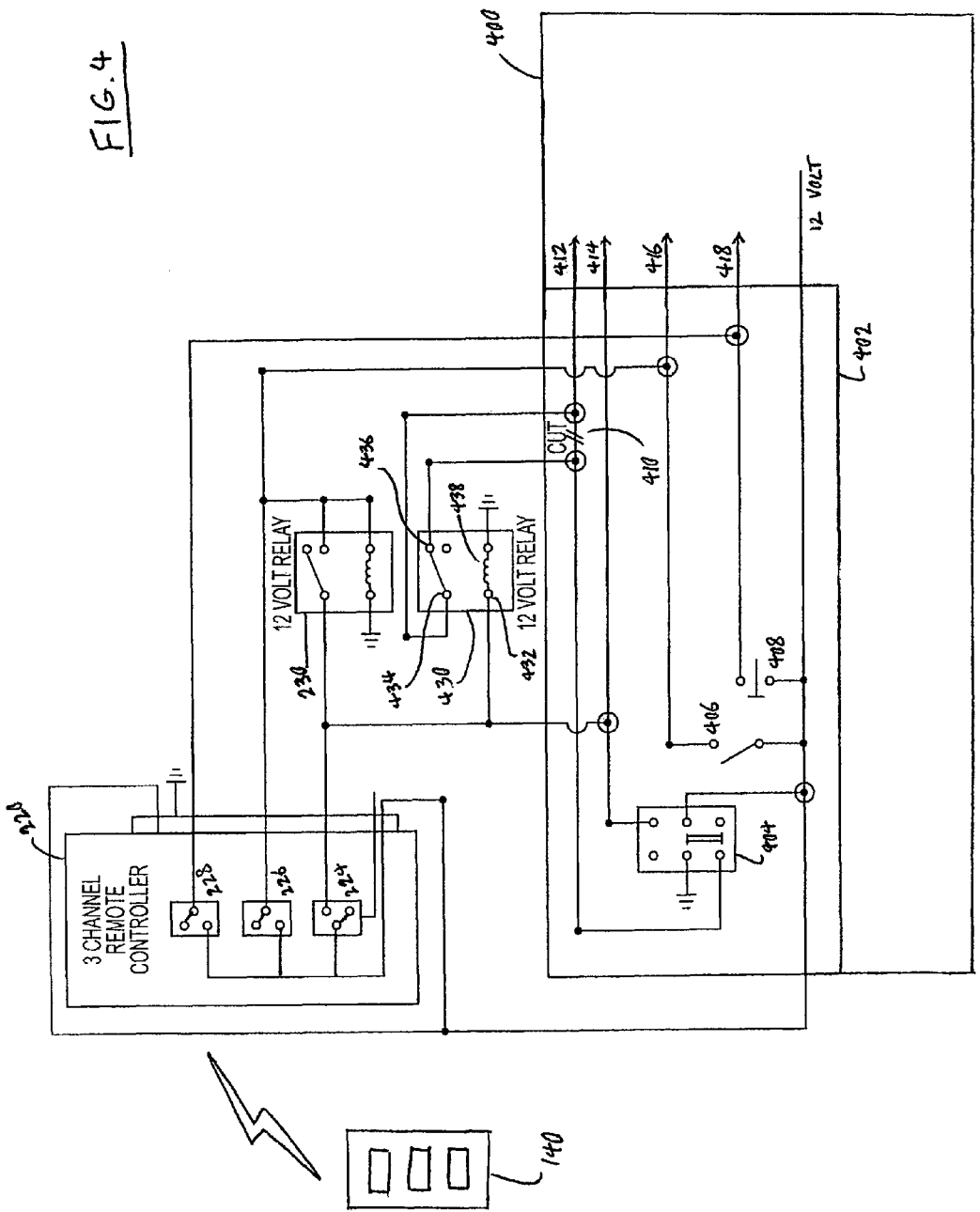
FIG. 4 depicts a block diagram of an exemplary system according to a fourth embodiment of the invention.

FIG. 4 depicts a welding machine 400 according to yet another embodiment of the invention. In this embodiment, the input unit 402 of the welding machine 400 includes four outputs: an OFF output 412, an ON output 414, a low idle output 416, and a start output 418. The start button 408 is coupled the start output 418. Similarly, the SPST low idle switch 406 is coupled to the low idle output 416. The sliding switch 404 selectively couples to the voltage source to one of the two outputs 412, 414. An example of the welding machine 400 is the Ranger 8 Welder by Lincoln Electronics® including a Kohler engine. The wireless receiver unit 220 is coupled to the outputs 416, 418 as described in the previous described with reference to FIG. 2. The wireless receiver unit 220 is also coupled to the ON output 414 via a retentive relay 230, as described with reference to FIG. 2. To control the OFF output 412, the wireless receiver unit 220 is coupled to a second retentive relay 430. Specifically, the switch 224 of the wireless receiver unit 220 is connected to the control terminal 432 of the relay 430. The OFF output 410 of the input unit 402 is then cut at location 410 and the two ends of the wire are connected to the first and second terminals 434, 436 of the relay 430. When the switch 226 is open, i.e., the ON output 414 is low, the relay 430 connects the two terminals 434, 436, thus allowing the output 412 to remain connected to the switch 404. However, when the switch 226 is closed, allowing the ON output 416 to go high, the coil 438 is activated, disconnecting the terminals 434, 436. As a result, both outputs 412, 414 of the output unit 402 can be controlled using a single switch 224.

While various embodiments have been described, there are alterations, permutations, and equivalents, which fall within the scope of the claims. It should be noted that there are many alternative ways of implementing the disclosed methods and apparatuses. It is therefore intended that the following appended claims be interpreted as including all such alterations, permutations, and equivalents.

The invention claimed is:

1. A welding apparatus comprising:
    a welding machine configured to output welding electric power, the welding machine including an input unit having a plurality of inputs relating to operations of the welding machine including a start input unit, a low-idle input unit, and an engine ON input unit; and
    a wireless receiver unit to receive wireless instructions for controlling the operations of the welding machine including activating operation, deactivating and idle operations of the welding machine, from a handheld wireless controller, the wireless receiver unit comprises
    a first switch,
    a second switch, and
    a third switch, wherein
        the first, second, and third switches are either a SPDT (Single-Pole Double-Throw) switch, a SPST (Single-Pole, Single-Throw) switch, or a normally open switch,
        the first, second, and third switches are connected to a same voltage source on one side of the switches, and
        the first switch is coupled to an output of the start input unit of the welding machine, the second switch is coupled to an output of the low-idle input unit of the welding machine, and the third switch is coupled to an output of the engine ON input unit of the welding machine, on the other side of the switches.

2. The welding apparatus of claim 1, wherein the wireless receiver unit comprises a 3-channel remote controller including two normally open switches and a SPDT (Single-Pole, Double-Throw) switch.

3. The welding apparatus of claim 2, further comprising a handheld wireless controller configured to communicate with the wireless receiver unit via a wireless link.

4. The welding apparatus of claim 2, wherein the input unit comprises a sliding switch arranged to selectively switch between an ON output and an OFF output.

5. The welding apparatus of claim 4, further comprising a second retentive electric relay coupled to the OFF output, the second retentive electric relay being configured to disconnect the OFF output from the sliding switch when the wireless receiver unit activates the ON output.

6. The welding apparatus of claim 1, further comprising a light coupled to an ON output of the input unit.

7. The welding apparatus of claim 1, further comprising a retentive electric relay arranged between a normally open switch in the wireless receiver unit and a low idle output of the input unit to hold the low idle output at a high level.

8. A method comprising:
    providing a welding machine configured to output welding electric power with a wireless receiver unit configured to receive wireless instructions for controlling the operations of the welding machine including activating, deactivating and idle operations of the welding machine, from a handheld wireless controller, providing the welding machine with an input unit having a plurality of inputs relating to operations of the welding machine including a start input unit, a low-idle input unit, and an engine ON input unit, providing the wireless receiver unit with a first switch, a second switch, and a third switch, while the first, second, and third switches are either a SPDT (Single-Pole Double-Throw) switch, a SPST (Single-Pole, Single-Throw) switch, or a normally open switch, coupling the first, second, and third switches to a same voltage source on one side of the switches, and coupling the first switch to an output of the start input unit of the welding machine, the second switch to an output of the low-idle input unit of the welding machine, and the third switch to an output of the engine ON input unit of the welding machine, on the other side of the switches.

9. The method of claim 8, wherein the wireless receiver unit comprises a 3-channel remote controller including two normally open switches and a SPDT (Single-Pole, Double-Throw) switch.

10. The method of claim 9, further comprising providing a handheld wireless controller configured to communicate with the wireless receiver unit via a wireless link.

11. The method of claim 8, further comprising providing a retentive electric relay arranged between a normally open switch in the wireless receiver unit and a low idle output of the input unit to hold the low idle output at a high level.

\* \* \* \* \*